US005942293A

United States Patent [19]

Occhipinti et al.

[11] Patent Number: 5,942,293

[45] **Date of Patent: *Aug. 24, 1999**

[54] FILE MARKER

[75] Inventors: Vincent Occhipinti, LaGrange Park; Peter Occhipinti, Itasca; Salvatore Occhipinti, Elgin, all of Ill.

[73] Assignee: A.I.P. Products, Inc., South Elgin, Ill.

[ * ] Notice: This patent is subject to a terminal disclaimer.

[21] Appl. No.: 08/886,699

[22] Filed: Jul. 1, 1997

Related U.S. Application Data

[63] Continuation-in-part of application No. 08/587,141, Jan. 16, 1996, Pat. No. 5,676,439.

[51] Int. Cl.$^{6}$ .................................................. A01N 1/00

[52] U.S. Cl. ................................ 428/15; 428/14; 428/99; 428/100; 428/124; 428/163; 428/167; 428/213; 428/596; 312/193.4; 312/187; 312/184; 211/41; 211/46; 211/60.1; 211/124; 24/329; 24/335; 24/346

[58] Field of Search ................................ 428/15, 14, 596, 428/213, 100, 99, 163, 124, 167, 131, 230; 312/186, 184, 193.4, 187; 24/346, 329, 335, 343; 211/46, 41, 60.1, 124

[56] References Cited

U.S. PATENT DOCUMENTS

| | | | |
|---|---|---|---|
| D. 231,714 | 5/1974 | Arthur | D20/22 |
| D. 307,441 | 4/1990 | Robertson, Jr. | D19/34 |
| D. 331,598 | 12/1992 | Martin | D19/32 |
| 1,917,980 | 7/1933 | Kelsey | 312/183 |
| 1,932,935 | 10/1933 | Hubbard | 434/109 |
| 3,090,347 | 5/1963 | Harnett, Jr. | 116/237 |
| 3,814,490 | 6/1974 | Dean et al. | 312/183 |
| 4,218,838 | 8/1980 | Zippel | 40/359 |
| 4,391,853 | 7/1983 | Pointon | 427/152 |
| 4,489,836 | 12/1984 | Terrell | 211/45 |
| 4,530,176 | 7/1985 | Rejawan | 40/359 |
| 4,550,934 | 11/1985 | Goossen | 283/37 |
| 4,576,328 | 3/1986 | Snider et al. | 229/67.1 |
| 4,693,387 | 9/1987 | Stonier | 220/6 |
| 5,160,296 | 11/1992 | Katz | 462/6 |
| 5,312,177 | 5/1994 | Coulter | 312/184 |
| 5,318,834 | 6/1994 | Foulkes et al. | 428/304.4 |
| 5,405,020 | 4/1995 | Fotioo | 211/46 |

*Primary Examiner*—Deborah Jones
*Assistant Examiner*—Abraham Bahta
*Attorney, Agent, or Firm*—Hill & Simpson

[57] ABSTRACT

A file marker for marking the position of material removed from a file drawer or similar receptacle is disclosed. The file marker comprises a relatively flat body portion having a body side edge, a clip body extending from the body side edge, and a clip extending downwardly from the clip body and defining a gap adjacent to the body side edge for receiving a file rail. The clip is resiliently biased toward the body portion and is resiliently movable to adjust the size of the gap for receiving file rails of varying widths. The adjustable clip is particularly beneficial for accommodating the assorted types of file rails typically found in lateral files and file drawers in office furniture.

19 Claims, 4 Drawing Sheets

FIG.1
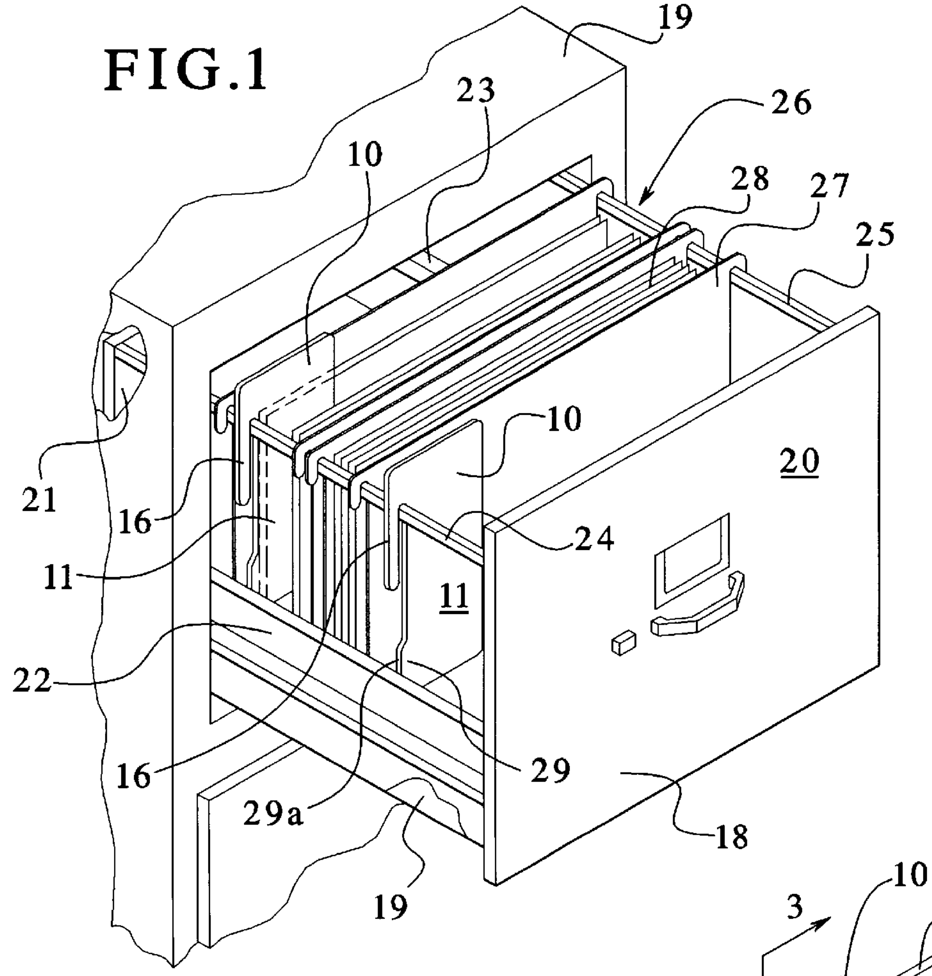
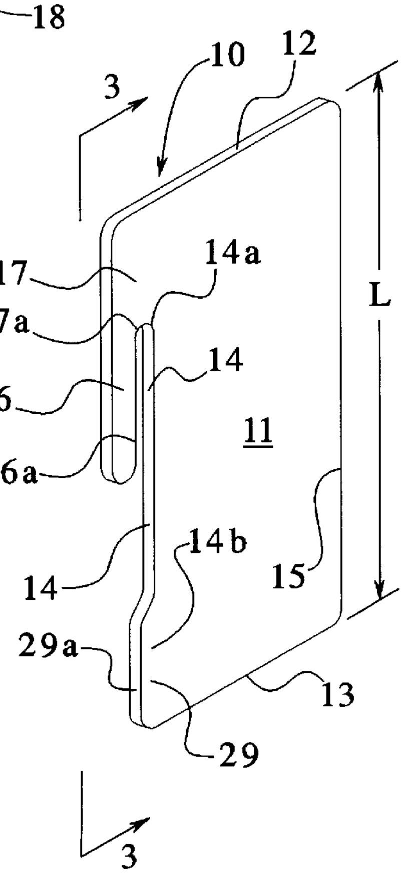
FIG.2

FILE MARKER

RELATED APPLICATIONS

This application is a continuation-in-part of application Ser. No. 08/587,141, filed Jan. 16, 1996, now U.S. Pat. No. 5,676,439.

BACKGROUND AND SUMMARY

This invention relates to filing systems and more particularly to devices for marking positions where material has been removed from within a file drawer or similar receptacle.

Many different methods are commonly used to mark the position of material removed from a file. One such method is to insert a self-stick note, such as sold under the trademark Post-it by 3M, in the position within the file where material has been removed. However, such notes tend to fall off over time and have somewhat of a sloppy appearance. Another commonly used method is to lift a portion of the file contents, such as a sheet of paper, upwards so that it sticks out of the general file contents and marks the position of the removed material. However, the displaced material generally has a sloppy and disorganized appearance as well as sometimes creating problems with opening and closing the file drawer.

A combined file marker and measuring instrument has been proposed in Martin design U.S. Pat. No. 331,598. The file marker includes two legs attached to the top of a ruler for defining V-shaped grooves which grip the leading edge of a hanging file folder. However, positioning of the file marker is limited to the leading edges of hanging file folders which have a steel rod running therethrough and can support the weight of the file marker. In contrast, individual sheets of paper and the like do not have the strength to support the file markers and it is believed that the file marker would be ineffective for marking positions within the contents of the file folders.

The present invention lies in providing a file marker for overcoming the problems associated with the prior art methods of marking the position of material removed from a file. In particular, the inventive file marker is capable of infinite adjustment throughout file contents and can be positioned at any selected point along the file drawer, regardless of whether it is used to separate entire files or individual sheets of paper. Generally, the file marker includes a body portion and means extending from the body portion for engaging the rail of a suspension file drawer and permitting infinite positioning of the file marker within the contents of the file drawer.

In one embodiment, the means for engaging the file rail comprises a depending leg portion and an intermediate portion extending between and connecting the body portion and leg portion. The leg portion has a leg edge in spaced parallel relation to a body side edge of the body portion, and the parallel edges define a gap therebetween sized to receive the rail of a suspension file drawer. A projection member is provided on an end of the body portion opposite from the leg for engaging the inside of the side panel of the file drawer and maintaining the file marker in a level orientation. The length of the file marker should be such that it engages both the rail and side panel and such length is also advantageous in that it fits within a standard 3 by 5 address/telephone card file in a horizontal orientation. The file marker therefore can serve the dual functions of being used as a file marker within a suspension file drawer and within a standard 3 by 5 address/telephone card file.

Another important aspect of this invention lies in providing a file marker that is capable of being positioned on file rails having varying thicknesses from the extremely thin type of hang rails to the relatively thick type. Typically, file cabinet manufacturers make hang rails of assorted thicknesses and the differences in the thicknesses of the hang rails can vary considerably—particularly within file drawers contained in office furniture or lateral files. Accordingly, one object of the present invention is to provide a file marker that can be used with virtually any manufacturer's cabinet or office furniture by being adapted to accommodate hang rails of assorted thicknesses.

In one embodiment, the file marker includes a relatively flat body portion having at least one generally straight body side edge and a clip body extending from the body side edge. The clip body also includes a clip extending downwardly from the clip body and defining a gap adjacent to or along the body side edge for receiving a file rail. The clip is resiliently deformable to selectively adjust the width of the gap to receive file rails of assorted and varying widths.

The clip forms a gap having an initially narrow width but is resiliently deformable to expand the gap to have an expanded width for receiving file rails of greater thicknesses. When the clip has an expanded width beyond its initial width, the clip is resiliently biased towards the body portion of the file marker so that its snugly receives file rails. In one embodiment, the initial width of the gap was about 1/16 of an inch, and the width of the gap was expandable to about 1/4 of an inch. Preferably, the clip is resiliently deformable to define the gap for receiving file rails having varying widths of between about 1/16 to 1/4 inches.

The clip body includes a head portion, a first leg secured to the body portion, and the second dependent leg portion that forms the clip, which defines the gap adjacent to the first leg of the clip body. The clip itself is preferably formed of a resiliently deformable web portion and a rigid head portion. In use, the clip is forced downward over a file rail such that the rail engages the rigid head and the rigid head in turn exerts a force on the resiliently deformable web portion that permits the clip to swing outward away from the body portion to enlarge the gap. The rigid head includes a rounded corner and the first leg portion includes a ramp for facilitating insertion of thicker file rails into the gap formed by the clip body.

Other advantages, objects, and features of the invention will become apparent from the following drawings and specification.

BRIEF DESCRIPTION OF THE DRAWINGS

FIG. 1 is a perspective view of the one embodiment of an inventive marker in combination with a suspension file drawer.

FIG. 2 is a perspective view of one embodiment of the file marker.

DETAILED DESCRIPTION OF PREFERRED EMBODIMENT

Figure 4:
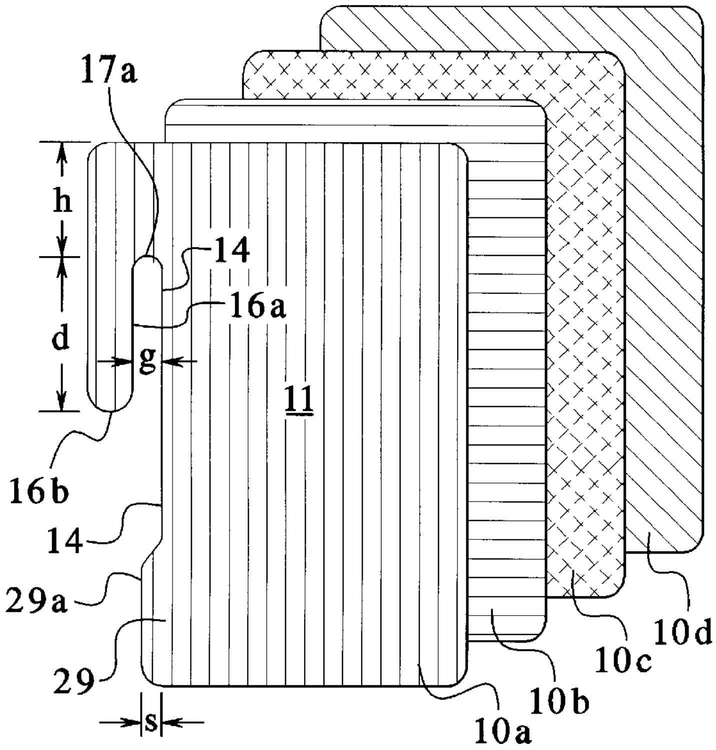
FIG. 4 is a front elevational view of one embodiment of a kit of color-coded colored file markers.
Figure 3:
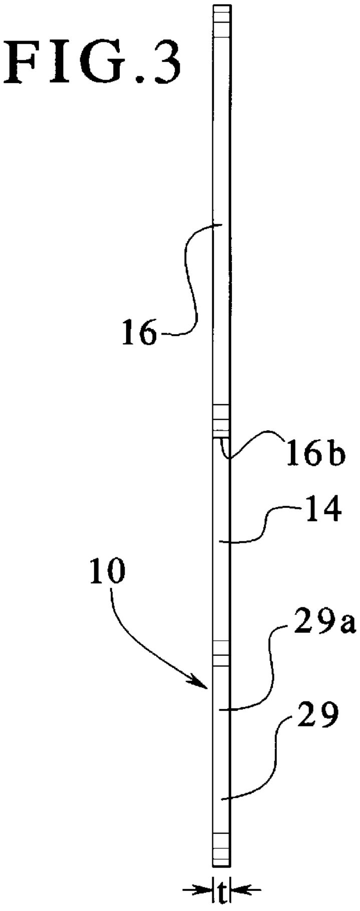
FIG. 3 is a side elevational view of one embodiment of the file marker.

Referring to the drawings, the numeral 10 generally designates one embodiment of the file marker of this invention. File marker 10 includes a body portion 11 shown in the form of a relatively flat rectangular panel having generally rounded or radius corners. However, it will be understood that the configuration and size of body portion 11 may vary considerably depending upon the particular use for which it is intended.

Referring to FIG. 2, body portion 11 includes top and bottom edges 12 and 13 and body side edges 14 and 15. One of the body side edges is provided with means for engaging the rail of a suspension file drawer and allowing infinite positioning of the file marker along the rail and within the contents of the file drawer.

Figure 13:
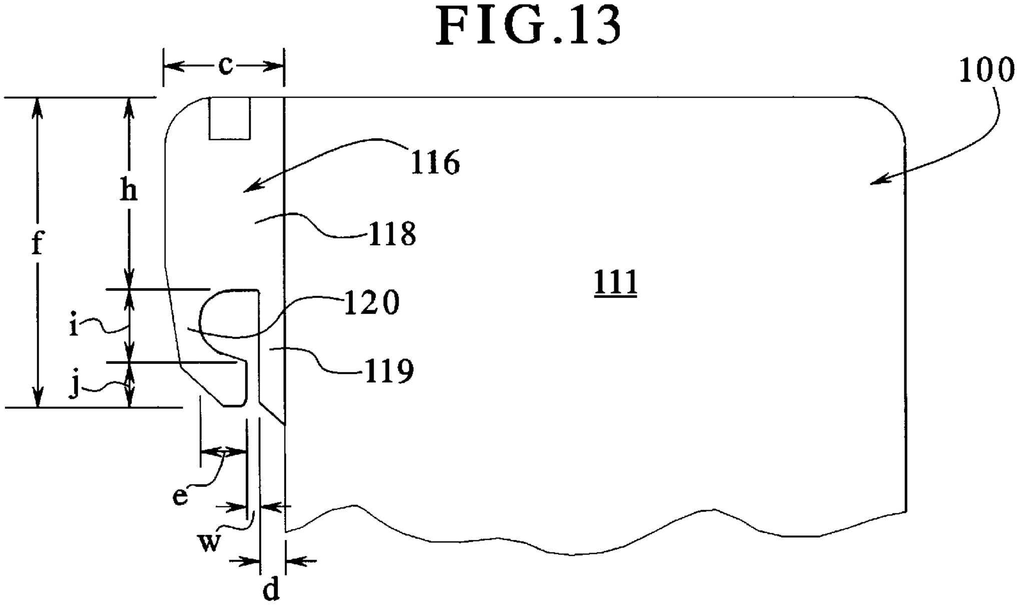
FIG. 13 is an partial front elevational view of another embodiment of the inventive file marker.

In the embodiment given in FIGS. 1–5, the engaging means includes leg portion 16 and intermediate portion 17 which extends between and connects body portion 11 and leg portion 16. Leg portion 16 and intermediate portion 17 are positioned adjacent to a first end portion 14*a* of body side edge 14 but may be provided on either side or end of body portion 11. Leg portion 16 has a leg edge 16*a* in spaced parallel relation to body side edge 14, and the parallel edges define a gap g therebetween which is sized to receive a rail of a suspension file drawer. The width of gap g between edges 16*a* and 14 should be about 0.125 to 0.3125 inches, preferably about 0.21875 inches, for accommodating most types of file rails. FIGS. 6 13 illustrate another embodiment of the inventive file marker that is particularly designed to accommodate file rails of assorted widths and is described in more detail hereinbelow.

Referring to FIG. 1, file marker 10 is shown in combination with a suspension file drawer 18 positioned within file cabinet 19. File drawer 18 includes a bottom 19*a*, a front panel 20, a back panel 21, two side panels 22 and 23, and first and second parallel rails 24 and 25 extending between the front and back panels 20 and 21 of the file drawer. Rails 24 and 25 are spaced above the top edges of side panels 22 and 23. Such a suspension file drawer 18 is conventional.

File contents generally designated at 26 are disposed in file drawer 18 and generally include hanging file folders 27 and sheets of paper 28 disposed within file folders 27. Since file markers 10 have means for engaging rails 24 and 25 and can be infinitely positioned along the length of file drawer 18, the markers can readily be placed between file folders 27 or between individual sheets of paper 28, as shown. The file marker is capable of such positioning because its positioning is not dictated by the file contents.

Referring to FIGS. 1, 2 and 4, file markers 10 are supported on rail 24 by a rounded or arcuate stop edge 17*a* of intermediate portion 17 which extends between leg edge 16*a* and body side edge 14. Stop edge 17*a* is rounded to generally conform to the rounded top edge of conventional file rails and to allow easy sliding of the file markers therealong. The height between stop edge 17 and top edge 12 of body portion 11 is important so that it will not hinder opening and closing of the file drawer, and the height h should be between about 0.75 and 1.25 inches, preferably about 1 inch. This distance between stop edge 17*a* and the terminal end 16*b* of leg portion 16 is also important so that the leg will have sufficient length to adequately grip the file rails and will not easily become dislodged. Distance d between the stop edge and the end of leg 16 should be about 0.5 to 2 inches, preferably about 1.5 inches, to adequately grip the file rails.

An elongate projection 29 extends outwardly from second end portion 14*b* of body side edge 14 and has a projection edge 29*a* parallel to body side edge 14 and leg edge 16a. Referring to FIG. 1, projection edge 29*a* engages the inside of side panel 22 of file drawer 18 so that the top edge 14 of body portion 11 maintains a horizontal orientation; otherwise, if body portion 11 were allowed to tip, one of the corners of top edge 12 might project upward and hinder opening and closing of file drawer 18. In one embodiment in which gap g had a width of approximately 0.21875 inches, projection edge 29*a* extended beyond body side edge 14 a spacing s of about 0.125 inches to ensure a level orientation of the top edge 12 of the file marker.

The length L of body portion 11 between top edge 12 and bottom edge 13 should also be sufficiently long to ensure that the end portion 14*b* of body side edge 14 engages the inside of the side panels of the file drawer. To achieve such results, length L is preferably between about 4.75 and 5.125 inches. Such a dimension is also advantageous since the file marker can then also be used in a horizontal orientation in conventional 3 by 5 address/telephone card files.

Figure 5:
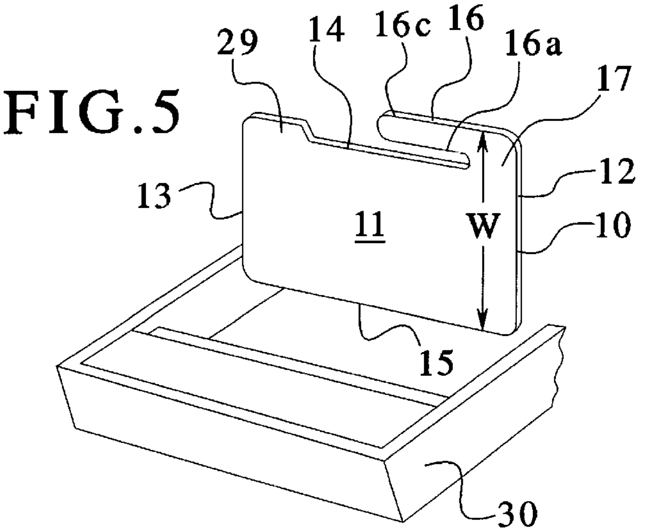
FIG. 5 is a perspective view of one embodiment of the inventive file marker in combination with an address/telephone card file.
Figure 6:
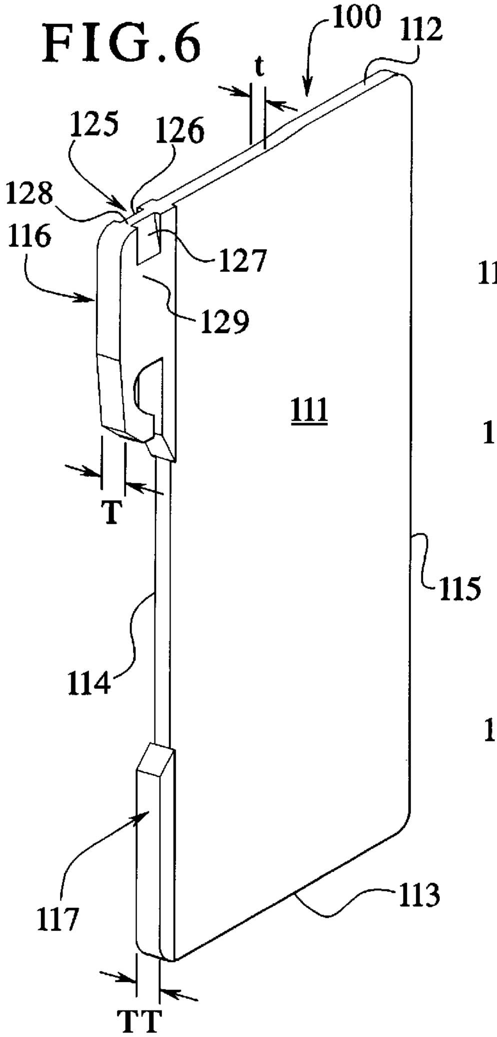
FIG. 6 is a perspective view of one embodiment of the inventive file marker.

Referring to FIG. 5, file marker 10 is shown in combination with an address/telephone card file 30, such as sold under the trademark ROLODEX. As mentioned, the length of the file marker is preferably between 4.75 and 5.125 inches so that it will serve the dual functions of both a file marker for a suspension file drawer and as a marker for a conventional address/telephone card file 30. The width w of the file marker between edge 15 and 16*c* on leg 16 is preferably at least 3 inches, and is preferably about 3.375 inches, so that leg 16 will protrude outwards from the contents of a conventional 3 by 5 address/telephone file.

File marker 10 may also be used to mark the position of material removed from so-called open-shelf files. In such an application, file marker 10 is inserted in the selected position so that body side edge 15 rests on the shelf which supports the files and top edge 12 projects outward from the files to mark the selected position. If desired, flexible leg portion 16 can be used to engage adjacent file material by slipping the edge of the adjacent file, paper or the like, between leg portion 16 and body side edge 14.

Another aspect of this invention lies in providing a kit of color-coded file markers 10*a*, 10*b*, 10*c* and 10*d* as shown in FIG. 4. File markers 10*a*, 10*b*, 10*c* and 10*d* are respectively shown as being color-coded in red, blue, green, and yellow. Providing the file markers in a color-coded kit of at least two different colors is advantageous since different colored file markers can be provided to different employees in an office for marking the position of removed files. In that way, when a different colored file marker is assigned to each person having access to a file, other personnel looking for a file can tell who has removed a file by the color of the file marker.

In the embodiment shown in FIGS. 1–5, the body portion 11, leg portion 16, and an intermediate portion 16 are preferably integrally molded of a polymeric material, such as polypropylene, so the three portions are coplanar and have a relatively uniform thickness t of about 0.0625 to 0.1250 inches. Such a thickness provides a relatively flat file marker for fitting between tightly packed file contents while still providing a file marker with sufficient strength for being inserted between such tightly packed file contents. While molding the file marker of a polymeric material such as polypropylene is believed to be preferred, it will be understood that file marker 10 can be manufactured in many different ways and made of a variety of different materials.

FIGS. 6–13 illustrate an alternate embodiment 100 of the file marker of this invention. File marker 100 includes a body portion 111 shown in the form of a relatively flat rectangular panel having generally rounded or radius corners. However, it will be understood that the configuration and size of body portion 111 may vary considerably depending upon the particular application for which it is intended. In the given embodiment, body portion 111 includes top and bottom edges 112 and 113 and first and second body side edges 114 and 115. File marker 100 is particularly adapted for use with file drawers having varying sizes of file rails such as typically found in lateral files and file drawers contained within office furniture.

Referring to FIGS. 6–9, file marker 100 includes a clip body 116 extending from one end of the body edge 114 of body portion 111. File marker 100 also includes a projection portion 117 extending from the opposite end of the body side edge 114. The clip body 116 and projection portion 117 are provided for positioning file marker 100 within the file drawer.

Figure 7:
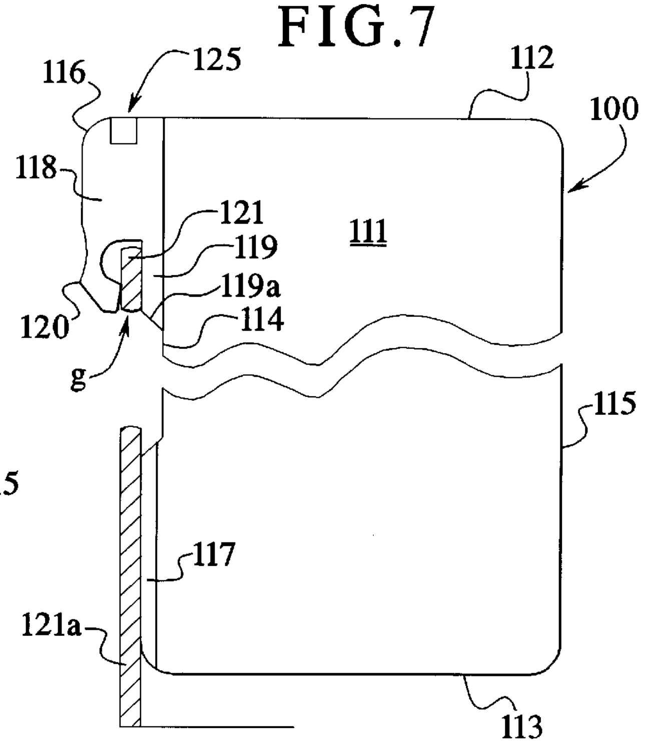
FIG. 7 is a front elevational view of one embodiment of the inventive file marker in combination with a file drawer.
Figure 8:
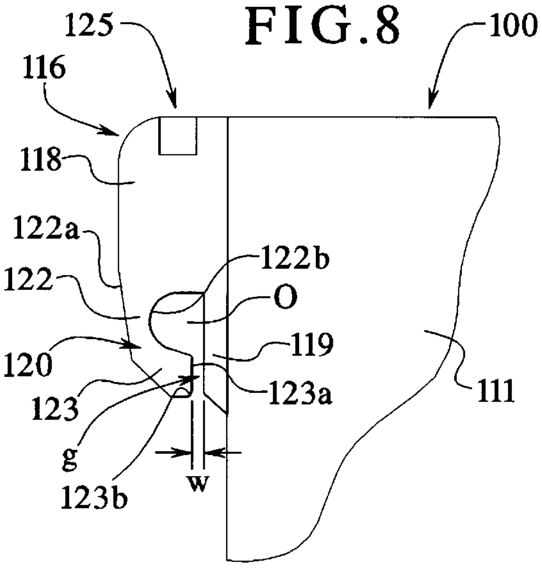
FIG. 8 is an enlarged front elevational view of a portion of one embodiment of the inventive file marker.
Figure 9:
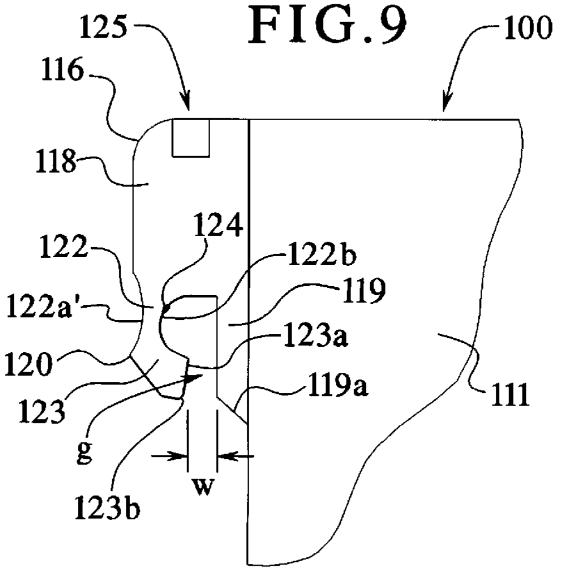
FIG. 9 is an enlarged front elevational view of a portion of one embodiment of the inventive file marker.

In the embodiment given in the illustrations, clip body 116 generally takes the form of an inverted U-shaped body including a head 118, a first dependent leg 119, and a second leg portion or clip 120. Clip 120 extends downwardly from clip body 116 and defines a gap g (as shown in FIGS. 8 and 9) generally along or adjacent to the side edge 114 of body portion 111 for receiving a file rail 121 as shown in FIG. 7. As shown, clip 120 defines the gap g across from the first leg 119 of clip body 116, and the file rail 121 fits between clip 120 and leg 119. However, it will be understood that leg 119 could be omitted and clip 120 could define the gap g with side edge 114 of the portion 111.

Referring to FIG. 8, file marker 100 is shown prior to any use and clip 120 is formed to define the gap g to have an initial width w. In this initial state, the gap g preferably has an initial width w of about 1/16 of an inch for receiving thin file rails. Referring to FIGS. 7–9, clip 120 is resiliently deformable away from body 111 to expand or enlarge gap g to have an expanded width W greater than the initial width w shown in FIG. 8. Due to the resiliency of the clip 120, clip 120 is resiliently biased toward the body 111 when gap g has an expanded width W. Clip 120 can therefore accommodate file rails 121 having a variety of widths or thicknesses and, in the preferred embodiment, can accommodate file rails having a width or thickness between about 1/16 to 1/4 inches. Preferably, clip 120 defines the gap g to have an initial width w of about 1/16 of an inch, and clip 120 can be resiliently deformed outward to define the gap g to have an expanded width W of about 1/4 of an inch.

By providing resiliently deformable clip 120 to define a gap g of selectively adjustable width, file marker 100 can be used with a variety of file having assorted hang rail thicknesses or widths. Typically, file cabinet and office furniture manufacturers make the hang rails of file drawers of a variety of assorted thicknesses. For example, the hang rails in file drawers placed within office furniture (such as a desk) and in lateral files tend to be fairly thin while some lateral files and vertical files tend to have thicker file rails. In use, clip 120 can be easily slipped over the thin file rails and can be more forcibly slipped over thicker file rails. As the thickness of the file rail progresses, it will be more difficult to initially slide clip 120 over the file rail. However, even though the first few uses of the file marker on thicker rails will fit snugly on the rail, clip 120 is designed to self-adjust after several uses to the thickness of the rail.

In the embodiment given in the illustrations, clip 120 is generally comprised of a thin web portion 122 extending downwardly from clip body 116 and an enlarged rigid head portion 123. The head portion 123 is generally rigid, does not deform, and is meant to engage the file rail 121 when the file rail 121 is forcibly inserted into the gap g. The head portion 123 includes a flat face **123*a* across from leg 119, and a rounded corner 123*b* directly adjacent to and leading into the gap g. The leg 119 also includes a slanted face or ramp 119*a* directly across from the face 123*a* and rounded corner 123*b* of the head portion 123. When inserting thicker file rails 121 into the gap g, the rounded corner 123*b* of head 123 and the ramp 119*a* of leg 119 cooperate to guide file rail 121 into the gap g and to help urge the entire clip 120 generally outward away from the body portion 111** so that the gap g has an expanded width W.

The thin web portion 122 of clip 120 is the portion that resiliently deforms when the clip 120 is moved outward to form an expanded gap having an expanded width W. As shown in FIG. 8, the web portion 122 is thinner than head portion 123 and includes an angled straight edge **122*a* and an inner curved or arcuate edge 122*b*** that defines a large opening O above gap g.

In use, the file rail 121 is inserted into gap g to exert a force upon the rigid head 123 so that clip 120 will resiliently deform outward to enlarge or expand gap g will have a large width W. During this process, the web portion 122 of clip 120 will resiliently deform and its outer angled edge **122*a* will flex or curve inward as shown at 122*a*' in FIG. 9. At the same time that the outer edge 122*a* deforms, the inner edge or area 122*b* of the web portion 122 will also deform by stretching to form a stretched region or stress point 124. In the commercial embodiment of file marker 100, when clip 120 is stretched outward sufficient to deform the web portion 122, the stretched region 124 will slightly discolor. After repeated uses of slipping the clip 120 over a thicker file rail 121 or leaving the clip 120 fitted over an enlarged file rail 121, the clip 120 will permanently deform at web portion 122 (including the stretched region 124) so that the file marker 100 and clip 120 can more easily be used with file rails 121** having greater thicknesses.

To facilitate use of the file marker 100 on a regular basis with file rails 121 having greater thicknesses, file marker 100 includes an expanding means for permanently enlarging the gap g of another file marker 100. In the embodiment shown in FIGS. 6–13, the expanding means is generally provided on the clip body 116 and is generally designated at the numeral 125. In the given embodiment, the expanding means 125 is formed at the top of the head portion 118 of the clip body 116. The expanding means includes first and second ramps 126 and 127 that extend from a narrow leading edge 128 backwards to a thickened portion 129.

Figure 10:
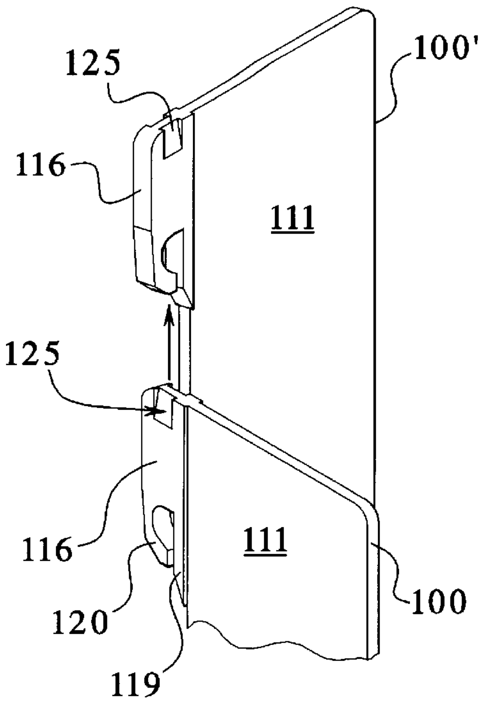
FIG. 10 is a perspective view illustrating two of the inventive file markers and one of the steps for using one file marker to enlarge the gap of the other file marker.
Figure 11:
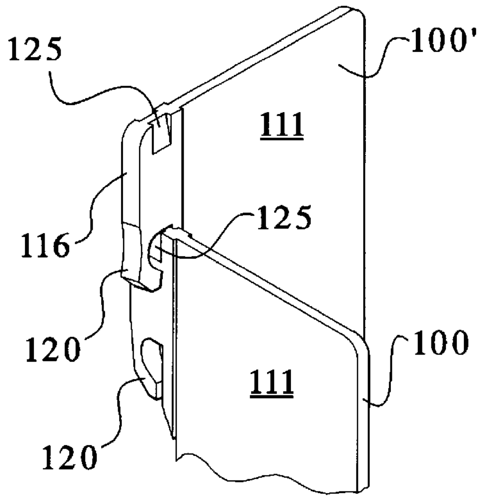
FIG. 11 is a perspective view illustrating two of the inventive file markers and one of the steps for using one file marker to enlarge the gap of the other file marker.

The method for using the expanding means is shown in FIGS. 10 and 11. Specifically, a first file marker 100 is placed perpendicular to the second file marker 100' and then the leading edge 128 of the expanding means of the first file marker 100 is urged towards the gap g of the second file marker 100'. The leading edge 128 is inserted into the gap g and then the ramps 126 and 127 push clip 120 outwards to enlarge the gap g to an expanded width W. The ramps 126 and 127 push the clip 120 outward until the clip engages the thickened portion 129 of clip body 116 in a fully expanded position. Thereafter, the first and second file markers 100 and 100' should be left in the position shown in FIG. 11 for one to five minutes. By holding clip 120 in the expanded position for one to five minutes, the web portion 122 of clip 120 will permanently deform so that clip 120 will easily slip over file rails 121 of larger thicknesses.

Similar to the embodiment 10 of the inventive file marker, inventive file marker 100 is also preferably made of a polymeric material and is most preferably injection molded of polypropylene. Polypropylene provides many advantages over other materials including its stiffness and memory for inserting the body portion 111 into tightly packed file materials, and also the ability to write on the material with a grease pen and then erase the markings. In addition, it is believed that polypropylene is particularly preferable because of the amount of resiliency it provides to clip 120. Specifically, the clip 120 formed of polypropylene is fairly resistant to movement but is resiliently deformable to expand the width of gap g. In addition, when the clip 120 is repeatedly deformed for a sufficient length of time (such as 1 to 5 minutes), the material will permanently deform to more easily bend for additional uses on file rails of greater thickness. While it is believed that polypropylene is the most preferred polymeric material, it will be understood by those skilled in the art that other polymeric materials and the like may also be employed in using the invention.

In one embodiment, the clip body 116 and body portion 111 includes specific dimensions as shown in FIG. 13. Specifically, the clip body 116 has a total width c of about ½ of an inch, the initial gap g has an initial width w of about 1⁄16 of an inch, the leg 119 extends beyond body side edge 114 a distance d of about ⅛ of an inch, and the opening O above gap g extends beyond gap g a length e of about ⅛ of an inch, and opening O has a total width of about ¼ of an inch. Turning to the lengthwise dimensions, clip body 116 has a total height f of about 1⅜ inches, the head portion 118 has a height h of about ⅞ of an inch, the opening O has a height i of about 5⁄16 of an inch, and the gap g has the height j of about 5⁄32 of an inch. While specific dimensions and dimensional ranges have been given for one embodiment of the inventive file marker 100, it will be understood that the dimensions of the clip body and the other portions can vary considerably depending upon the particular application for which the file marker is intended.

The body portion 111 of file marker 100 preferably has a width w of about 2½ to 3 inches, preferably about 2¾ inches. Such a width is sufficient to permit ready identification of the file marker within a file and to adequately penetrate the file contents. Notably, the width of the body portion 111 is significantly shorter than the width of a typical file drawer which generally would fall in the range of 12 to 15 inches. In other words, the width of the file marker is typically less than about 30% of the width of a selected file drawer. While the body portion 111 of the inventive file markers may have such specific dimensions, it will be understood that the width of the body portion may vary considerably depending upon the particular application for which the file marker is intended.

Clip body 116 preferably has a thickness T greater than the thickness t of the main body portion 111 as shown most clearly in FIG. 1. The greater thickness T of clip body 116 advantageously provides more surface area for engaging file rail 121 and stabilizing the file marker 100 on rail 121. In addition, the projection portion 117 is similar to projection portion 29 in the embodiment shown in FIGS. 1–5 except that it has a thickness TT greater than the thickness t of the body portion 111. Again, the greater thickness of the projection portion 117 provides a greater contact area for engaging side panel **121*a*** of a file drawer and thus facilitates stabilization of the file marker within the drawer.

Figure 12:
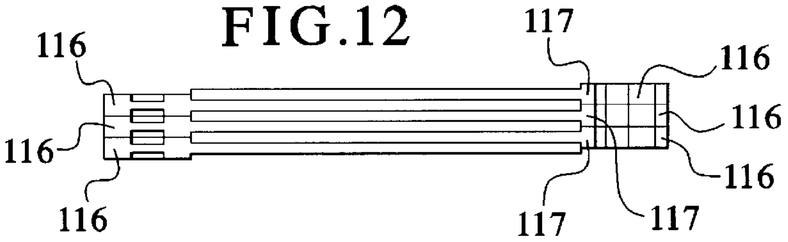
FIG. 12 is an end elevational view showing a stack of the inventive file markers.

Preferably, clip body 116 had a thickness T of about ⅛ of an inch, the body portion 111 has a thickness t of about 1⁄16 of an inch, and the projection portion 117 had a thickness TT of about ⅛ of an inch. Such dimensions also facilitate stacking of the file markers 100 together as shown in FIGS. 12 and 13. In particular, the body portions 111 of the stacked file markers 100 can fit adjacent to each other and the clip body 116 and projection portions 117, having greater thicknesses, overlap the body portions 111 of the adjacent file markers 100 and are also correspondingly stacked together. The overlap of the clip bodies 116 and projection portions 117 along the ends of the body portions 111 will hold the file markers 100 in such a stacked position for easy packing, shipping, etc. While preferred dimensions of the file marker have been provided, it will be understood that the dimensions may vary considerably depending upon the particular application for which the file marker is intended.

While in the foregoing specification a detailed description of specific embodiments of the invention are set forth for the purposes of illustration, it will be understood by those skilled in the art that many of the details herein given may be varied considerably without departing from the spirit and scope of the invention.

We claim:

1. A file marker comprising:

a relatively flat body portion having at least one generally straight body side edge;

a clip body extending from said body side edge of said body portion; and a clip extending downwardly from said clip body and defining a gap for receiving a file rail, said clip being resiliently deformable to selectively adjust a width of said gap to receive file rails of varying widths.

2. The file marker of claim 1 in which said clip is formed to define said gap having an initial width but is resiliently deformable to expand said gap to have an expanded width, said clip being resiliently biased towards said body portion when said clip has said expanded width.

3. The file marker of claim 2 in which said initial width of said gap is about 1⁄16 of an inch and said expanded width of said gap is about ¼ of an inch.

4. The file marker of claim 1 in which said clip is resiliently deformable to define said gap for receiving file rails having widths of between about 1⁄16 to ¼ of an inch.

5. The file marker of claim 1 in which said clip body includes a head portion, a first leg portion secured to said body side edge of said body portion, and a second leg portion that comprises said clip.

6. The file marker of claim 1 in which said clip includes a resiliently deformable web portion and a rigid head portion.

7. The file marker of claim 1 in which said file marker includes means for expanding the gap of another file marker.

8. The file marker of claim 7 in which said expanding means is located on said clip body.

9. The file marker of claim 7 in which said expanding means comprises a narrow leading edge, a thickened portion, and at least one ramp extending between said narrow leading edge and said thickened portion adapted to be inserted into and expand the gap of another file marker.

10. The file marker of claim 1 in which said body side edge of said marker includes a first portion and a second portion with said clip body extending from said first portion and a projection portion extending from said second portion, said projection portion having a thickness greater than a thickness of said body portion of said file marker.

11. The file marker of claim 1 in which said body portion and said clip body are integrally molded of a polymeric material.

12. The file marker of claim 1 in which said polymeric material is polypropylene.

13. A file drawer and file marker combination comprising:

a file drawer having a bottom, front and back panels perpendicular to said bottom, two side panels perpendicular to said bottom, and first and second parallel rails extending between said front and back panels and being spaced above said side panels; and a least one file marker including a relatively flat body portion having at least one straight body side edge, a clip body extending from said body side edge, and a clip extending downwardly from said clip body for engaging and receiving one of said first and second rails of said file drawer, said clip being resiliently deformable to selectively adjust a width of said gap to receive file rails of varying widths.

14. The combination of claim 13 in which said clip is resiliently deformed outward away from said body portion by said one of said first and second rails and is resiliently biased toward said body portion to grip said one of said first and second file rails.

15. A method for marking the position of material removed from a file drawer, said method comprising the steps of:

providing a file drawer having at least one file rail and including file contents;

removing a portion of said file contents from a location within said file drawer;

providing a file marker comprising a relatively flat body portion and means for engaging a file rail; and positioning said file marker so that said engaging means engages said file rail of said file drawer and said body portion extends into said location where said portion of said file contents has been removed.

16. The method of claim 15 including the step of providing said file marker with said engaging means comprising a depending leg portion and an intermediate portion extending between and connecting the body portion and the leg portion.

17. The method of claim 15 in which said method includes a further step of providing said file marker with said engaging means comprising a clip body extending from a body side edge of said body portion and a clip extending downwardly from said clip body and defining a gap adjacent to said body side edge for receiving said file rail.

18. The method of claim 15 including the further step of providing said file marker with said clip being resiliently deformable to selectively adjust a width of said gap to receive file rails of varying widths.

19. The method of claim 15 including the further step of, prior to said step of engaging said file rail, inserting an expansion means in said gap to permanently deform said clip so that said gap has an expanded width.

* * * * *